(12) United States Patent
Ter Weeme et al.

(10) Patent No.: US 12,543,251 B2
(45) Date of Patent: Feb. 3, 2026

(54) LIGHTING CIRCUIT (71) Applicant: SIGNIFY HOLDING B.V., Eindhoven (NL)

(72) Inventors: Berend Jan Willem Ter Weeme, Eindhoven (NL); Bertrand Johan Edward Hontele, Breda (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 115 days.

(21) Appl. No.: 18/275,729

(22) PCT Filed: Feb. 8, 2022

(86) PCT No.: PCT/EP2022/052994
§ 371 (c)(1),
(2) Date: Aug. 3, 2023

(87) PCT Pub. No.: WO2022/175134
PCT Pub. Date: Aug. 25, 2022

(65) Prior Publication Data
US 2024/0090099 A1    Mar. 14, 2024

(30) Foreign Application Priority Data
Feb. 16, 2021  (EP) ..................... 21157302

(51) Int. Cl.
H05B 45/30     (2020.01)
H05B 45/20     (2020.01)
H05B 45/48     (2020.01)
H05B 45/345    (2020.01)

(52) U.S. Cl.
CPC ............ *H05B 45/48* (2020.01); *H05B 45/20* (2020.01); *H05B 45/345* (2020.01)

(58) Field of Classification Search
CPC ...... H05B 45/10; H05B 45/20; H05B 45/345; H05B 45/48; H05B 47/10
See application file for complete search history.

(56) References Cited

U.S. PATENT DOCUMENTS

| | | |
|---|---|---|
| 2006/0221636 A1 | 10/2006 | Ohashi et al. |
| 2007/0023454 A1 | 2/2007 | Ophardt |
| 2007/0035883 A1 | 2/2007 | Katcha et al. |
| 2007/0205977 A1* | 9/2007 | Kim ..................... H05B 45/382 345/102 |
| 2010/0264834 A1* | 10/2010 | Gaines .................. H05B 45/48 315/152 |
| 2011/0068702 A1 | 3/2011 | Van de Ven et al. |

(Continued)

FOREIGN PATENT DOCUMENTS

| | | | |
|---|---|---|---|
| JP | 2012099337 A | 5/2012 | |
| JP | 5303519 B2 | 10/2013 | |

(Continued)

*Primary Examiner* — Jimmy T Vu (57) ABSTRACT

A lighting circuit has a series connection of a plurality of lighting channels of different output colors, driven by a current source. Some or all of the lighting channels comprise a LED arrangement, a shunt switch in parallel with the LED arrangement and a current leakage path in parallel with the LED arrangement. The current leakage path is used to calibrate the current flowing through the LED arrangement and thereby take account of the LED characteristics.

12 Claims, 4 Drawing Sheets

(56) References Cited

U.S. PATENT DOCUMENTS

| | | | |
|---|---|---|---|
| 2013/0201677 A1 | 8/2013 | Ter Weeme et al. | |
| 2013/0207559 A1* | 8/2013 | Ferrier | H05B 45/48 315/192 |
| 2014/0197750 A1* | 7/2014 | Cash | H05B 45/20 315/192 |
| 2015/0163875 A1* | 6/2015 | Yu | H05B 45/48 315/201 |

FOREIGN PATENT DOCUMENTS

| | | | |
|---|---|---|---|
| JP | 2020194731 A | 12/2020 |
| WO | 2007023454 A1 | 3/2007 |
| WO | 2007035883 A2 | 3/2007 |
| WO | 2007035883 A3 | 6/2008 |

\* cited by examiner

LIGHTING CIRCUIT

CROSS-REFERENCE TO PRIOR APPLICATIONS

This application is the U.S. National Phase application under 35 U.S.C. § 371 of International Application No. PCT/EP2022/052994, filed on Feb. 8, 2022, which claims the benefit of European Patent Application No. 21157302.7, filed on Feb. 16, 2021. These applications are hereby incorporated by reference herein.

FIELD OF THE INVENTION

The invention relates to lighting circuits, in particular with multiple lighting channels.

BACKGROUND OF THE INVENTION

Multi-channel lighting circuits are well known. By providing light sources with different colors (i.e. color points) in the different channels, a desired overall color point can be achieved for the overall light output of the lighting circuit.

It is well known to use shunt switching within a multi-channel light source, for example using pulse width modulation (PWM) switching signals. A drive current is applied to the lighting load. Different channels are operated with different duty cycles to create the desired mix of light outputs from the multiple channels. This approach has the advantage that a spread in the drive current does not impact the color consistency of the overall light output, since all channels experience the same variation. As a result, the mixed color will remain essentially the same, only the flux will vary.

However, flux (and color) variations of the LEDs in the different channels need to be compensated in the controller software. For this purpose, information from the LED bins (which defines the characteristics of the specific LEDs used in the channels) need to be sent to the controller, or else a calibration measurement needs to be made. These bin characteristics are in particular the flux, color points and forward voltages for the different channels.

To implement this communication to the controller, the characteristics of the LEDs need to be recorded and managed. The need to transfer data between the LED arrangement (on the so-called L2 board) and the controller means the controller and the L2 board need to be paired. This means that they cannot be replaced independently. The need for data transfer from the L2 board to the controller also means significant additional data storage, handling and processing requirements. The alternative of a calibration measurement is costly.

In this shunt driving scheme, color consistency is regulated in software by adapting the PWM signals. This means it is not possible to connect several L2 boards in parallel using the same shunt switches, since the color compensation is at the level of the switches of each individual channel and L2 board.

Another known way to control a multi-channel light source is to have all channels (even for multiple L2 boards) in parallel connected to a voltage bus. A single switch can be used to actuate all channels of the same color. The current flowing to each channel in response to the common voltage can be tuned by adding series resistors to the LED string of each channel. The selection of suitable tuning resistors means that the light output flux of a channel is constant, regardless of the flux bin of the LEDs in the channel. The flux impact of the channels on the resulting color point of the overall light output is larger than the color point variation of the individual channels, so that an acceptable total color point variation is achieved.

This approach decouples the L2 board from the controller, but the circuit is less efficient than a current drive scheme and is sensitive to bus voltage variations. All channels also need to have approximately the same string voltage to prevent excessive losses, and this imposes an additional design constraint.

There is a need for an improved multi-channel lighting circuit which is energy efficient and avoids the need for significant calibration processes and associated computation power.

SUMMARY OF THE INVENTION

The invention is defined by the claims.

According to examples in accordance with an aspect of the invention, there is provided a lighting circuit, comprising:

a light source arrangement comprising a series connection or a parallel connection of a plurality of lighting channels of different output colors;

a current source for delivering a drive current to the light source arrangement; and wherein each lighting channel comprises:

an LED arrangement; and a current leakage path in parallel with the LED arrangement, wherein each current leakage path (Radd FW, Radd Lime, Radd CW) is arranged to bypass a current from the corresponding LED arrangement (12,14,16) such that the light output of each LED arrangement (12,14,16) is approximately equal when each LED arrangement (12,14,16) is driven by a substantially similar current.

When multiple LED arrangements are placed in a series or parallel configuration, the light output may differ between each LED arrangements when driven by an identical current because of the tolerances of the LEDs. These tolerances may for example be created by the manufacturing process of the LEDs. These tolerances may lie in the range of approximately ±10%. By placing a current leakage path in parallel with the LED arrangements, the light outputs (when they are provided with an identical current) can be brought closer together between the LED arrangements. Therefore, instead of having a light output deviation of ±10%, the light output deviation can be reduced significantly. The current leakage path needs to be arranged so that it can bypass a current from the corresponding LED arrangement such that the light output of each LED arrangement is approximately equal when each LED arrangement is driven by a substantially similar current.

In a further example, the lighting system comprises a controller, wherein the light source arrangement comprises the series connection and wherein each lighting channel comprises a shunt switch in parallel with the LED arrangement, wherein the controller is configured to control the shunt switches.

In this example, the lighting circuit uses shunt switches to implement flux control, with the advantage that a same color point is maintained in a simple manner at different brightness levels. However, to avoid the need to provide bin data (i.e. the performance of the LEDs used in the channels) to the controller, and to avoid the need for a calibration phase, a respective current leakage path is used to adapt the response of at least some of the LED arrangements to a delivered drive current. These current leakage paths thus create a hardware implementation of a compensation scheme for compensating for different LED characteristics, such as different LEDs being from different bins. The design of the current leakage paths is adapted to the characteristics of the associated LED arrangement without the need to relay any information to the controller or to provide a calibration measurement. In this way, the advantage of known voltage driven systems (needing no calibration) is combined with the advantages of shunt switching (which is more efficient and has low dependency on the drive current or voltage).

The LED arrangement of each one of the lighting channels may have a current leakage path. However, there may be some LED arrangements which do not need the leakage path (i.e. the current leakage path is effectively an infinite resistance i.e. open circuit). This is because some LED arrangements may represent the default (the minimum flux bin) to which the compensation is made for all other LED arrangements.

Note that "different colors" is only intended to mean different color points. For example, warm white, cool white and flame white may be considered to be different colors.

Each current leakage path for example comprises a resistor circuit. This provides a simple way to implement a current leakage path. The resistance is chosen such that the remaining current which reaches the LED arrangement results in a predetermined (i.e. calibrated) light output flux.

The current leakage path may instead comprise a current regulation circuit. This is an alternative way to divert current from the LED arrangement such that the remaining current generates the desired light output. The current regulation circuit makes the bypass current more independent and constant and functions as a constant current bypass circuit.

The controller may be adapted to apply different shunt switch PWM duty cycles for different light flux settings of the light source arrangement. This is more efficient than a constant voltage drive scheme.

The controller may additionally be adapted to apply different drive currents for different light flux settings of the light source arrangement. Thus, there may be amplitude control as well as PWM control for setting the light flux, for example for deep dimming.

For each LED arrangement, the current leakage path is for example adapted such that for a default drive current, the light output flux is calibrated to a desired value.

Thus, the light output flux is at a known level (for a given drive current) without needing feedback to the controller.

The default drive current is for example based on an expected color point and flux per channel thereby to achieve a desired color point for the light source arrangement with an actual flux matching an expected flux. The default drive current is for example the drive current for a minimum required flux for each of the channels for a lowest light flux bin of the light source arrangement, i.e. the drive current in which the lowest flux bin of each of the LED channels is still able to meet the minimum lighting requirements.

For an LED arrangement from the lowest flux bin, the bypass may be completely blocked with a very high resistance so that all current of the driver will flow through these LEDs. Thus, for LED arrangement with the lowest flux bin, no current leakage path is needed because all current is to pass through the LED arrangement.

Thus, the current leakage paths ensure that for a lowest light flux bin and the minimum light requirement (i.e. a lowest brightness level), the different channels contribute the required light output flux to create the desired overall color point and flux. This ensures that the desired color point and flux is generated right down to the lowest light output (brightness) level.

The light source arrangement may comprise a plurality of lighting boards, each having a respective series connection of a plurality of lighting channels of different output colors, wherein each shunt switch is shared between the LED arrangements of corresponding channels of the plurality of lighting boards.

Thus, lighting boards (so-called L2 boards) may be added to the lighting circuit. The shunt switches are shared between all of the lighting boards, since the same duty cycles can be applied to the different boards. This is because the compensation for the differences in the L2 boards is implemented at the boards themselves by the current leakage paths.

Each lighting board for example has a respective current leakage path in parallel with each LED arrangement.

Each lighting board has its own current leakage paths, whereas the shunt switching is shared between boards.

The invention also provides a luminaire comprising the lighting circuit as define above. The luminaire is for example a spot light.

These and other aspects of the invention will be apparent from and elucidated with reference to the embodiment(s) described hereinafter.

In another example, a lighting system comprises:
a first lighting circuit and a second lighting circuit, each lighting circuit comprising:
a light source arrangement comprising a series connection of a plurality of lighting channels of different output colors;
a current source for delivering a drive current to the light source arrangement; and
a controller,
wherein each lighting channel comprises:
an LED arrangement; and
a shunt switch in parallel with the LED arrangement,
wherein each lighting channel further comprises a current leakage path in parallel with the LED arrangement,
and wherein the controller is configured to control the shunt switches,
wherein each current leakage path is arranged to bypass a current from the corresponding LED arrangement such that the light output of the first lighting circuit and the light output of the second lighting circuit is approximately equal when each lighting circuit is driven by a substantially similar current.
in this example, a first and a second lighting circuit can be provided. They can be identical lighting circuits e.g. similar lamps, that also need to provide a similar light output at a single given setpoint. By providing a shunt switch, the light outputs of each lighting circuit can be controlled to the desired light. To omit the need of a calibration of the shunt switches with the corresponding LED arrangements, a current leakage path is provided across each LED arrangement. The current leakage paths are arranged such that the light output of the first lighting circuit and the light output of the second lighting circuit is approximately equal when each lighting circuit is driven by a substantially similar current. This allows the light output of each lighting circuit to be closer to each other without requiring the calibration step. The controller can be simplified because of the omission of the calibration.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a lighting circuit having a series connection of a plurality of lighting channels of different output colors, driven by a current source. Each lighting channel comprises a LED arrangement and a shunt switch in parallel with the LED arrangement. Some or all LED arrangements have a current leakage path in parallel with the LED arrangement. The current leakage path is used to calibrate the current flowing through the LED arrangement and thereby take account of the LED characteristics.

Figure 1:
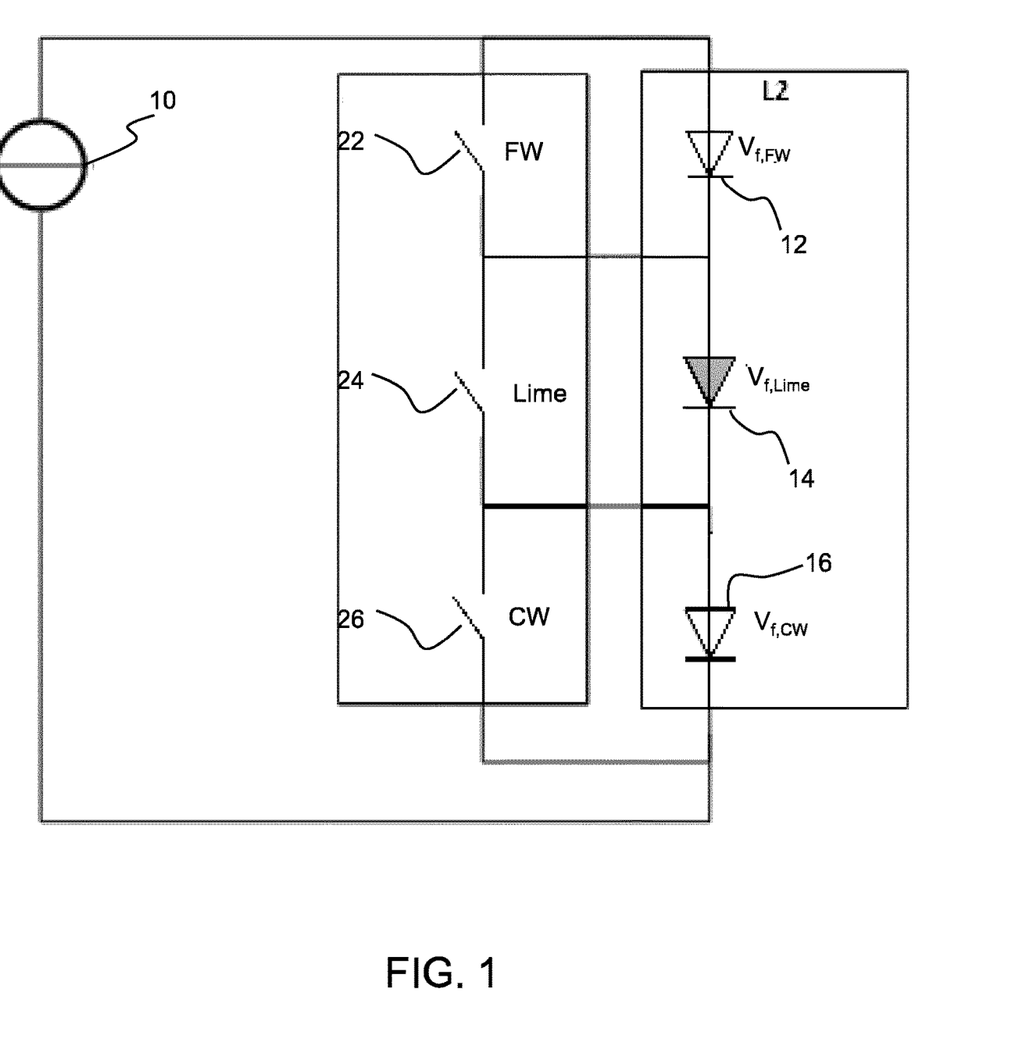
FIG. 1 shows a known current driven lighting circuit using shunt switches.

FIG. 1 shows a known current driven lighting circuit using shunt switches. The circuit comprises a current source 10 which delivers current to a series connection of a plurality (three in this example) of lighting channels of different output colors.

Each lighting channel comprises a respective LED arrangement 12, 14, 16 and a shunt switch 22, 24, 26 in parallel with the LED arrangement.

The different colors in this example are cool white (CW, 6500K), flame white (FW, 2200K) and Lime (with a dominant wavelength in the range 550 nm to 590 nm. There is a forward voltage drop Vf across each LED arrangement, hence $V_{f,FW}$, $V_{f,CW}$ and $V_{f,Lime}$.

There may be any number of individually addressable channels and any set of colors.

A PWM switching scheme is used to control the shunt switches. The different channels are operated with different duty cycles to create the desired mix of light output from the multiple channels to create an output of the desired color and flux. Flux (and color) variations of the LEDs in the different channels are compensated in the software of the system controller (not shown). For this purpose, light flux and color point information from the LED bins is for example sent to the system controller. The need for data transfer from the lighting board to the controller requires data storage, handling and processing requirements.

Figure 2:
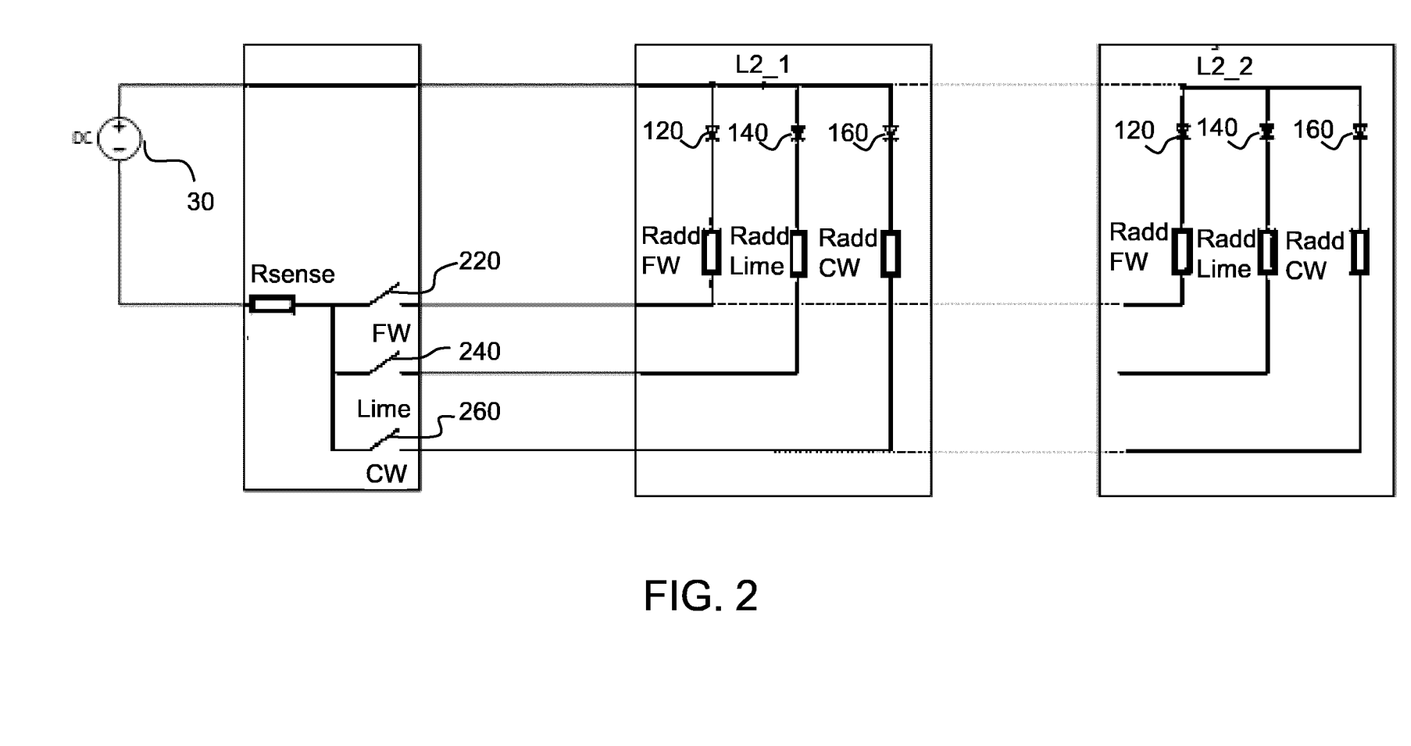
FIG. 2 shows a voltage drive arrangement with a voltage source that delivers a bus voltage.

FIG. 2 shows a voltage drive arrangement with a voltage source 30 that delivers a bus voltage. The bus voltage may be provided to multiple lighting boards, L2_1 and L2_2.

Each lighting board in this case has parallel lighting channels. Each lighting channel comprises a LED arrangement 120, 140, 160 in series with a calibration resistor Radd FW, Radd Lime, Radd CW.

Each channel is also in series with a series switch 220, 240, 260. Each series switch thus allows current to flow or else blocks current from flowing in the channel. The series switches are shared between the channels of the multiple lighting boards. This is possible because the compensation for the characteristics of the different LED arrangements is handled by the additional resistors. Thus, different currents can flow in the different channels even with the same drive voltage and shared series switch.

This approach decouples the L2 board from the controller, but the circuit is less efficient than a current drive scheme and is sensitive to bus voltage variations. All channels also need to have approximately the same string voltage to prevent excessive losses, and this imposes an additional design constraint.

Figure 3:
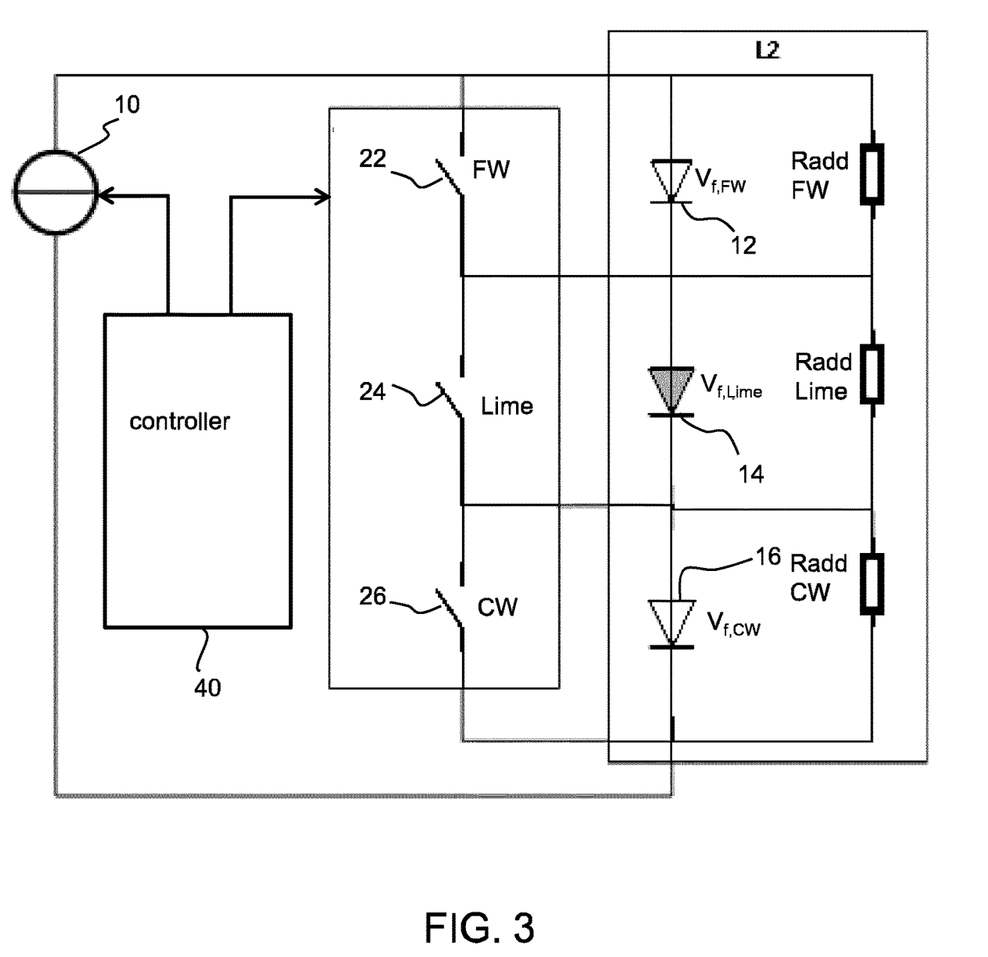
FIG. 3 shows a lighting circuit in accordance with an example of the invention.

FIG. 3 shows a lighting circuit in accordance with an example of the invention. It may be considered to be a modification to the current driven circuit of FIG. 1. The same reference numbers are used as for the circuit of FIG. 1.

The lighting circuit again comprises a series connection of a plurality of lighting channels of different output colors.

Each lighting channel comprises a LED arrangement 12, 14, 16 and a respective shunt switch 22, 24, 26 in parallel with one of the LED arrangements. Each LED arrangement may be a single LED or an LED string, and is represented in the examples as a single LED symbol for clarity.

A current source 10 delivers a drive current to the light source arrangement. This may be any suitable current source, such as a switch mode current regulator (e.g. a hysteretic buck converter) that keeps the LED drive current at a quasi-constant level by measuring and regulating, independent of the actual voltage level of the LED arrangement.

A desired color output is achieved by a desired relationship between the PWM settings of the shunt switches. To control the brightness, the controller may adjust only the PWM settings (in synchronism with each other). However, this PWM control may alternatively be combined with amplitude modulation. This may address problems of PWM resolution at very deep dimming brightness setting (<2% brightness).

The shunt switches may be controlled with any desired timing arrangement. For example, they may all be open at the same time so that the drive current flows through all three channels at the same time. The switches may then be closed at different times within the period of the duty cycle control to implement bypass paths and thereby turn off the channels at different times. For example, at the beginning of the duty cycle period, all switches may be closed, and they may open when the desired duty cycle has been reached for each of the channels.

Instead, some channels may be made to emit light starting at the beginning of the duty cycle and others may be made to emit light at the end of the duty cycle period, to reduce the amount of time when there is no light output.

A simplest implementation is to start all channels at the same time. However, it is preferred to stagger the on-periods, both for continuity of the light but also to limit the voltage changes resulting from the different LED forward voltages which are connected in the circuit since it is more difficult to keep a stable current with large voltage jumps.

FIG. 3 also shows a controller 40 for controlling the shunt switches 22, 24, 26. By adjusting the duty cycles in proportion to each other, a color point is maintained but the light flux is controlled, i.e. to implement dimming. It may also control the drive current level, as explained above, for example during deep dimming.

In accordance with the invention, some or all of the channels also have a current leakage path in parallel with the LED arrangement. In the example shown, each channel has a current leakage path and each current leakage path is a bypass resistor Radd FW, Radd Lime, Radd CW. The current leakage paths avoid the need to provide bin data (i.e. the performance of the LEDs used in the channels) to the controller, and avoid the need for a calibration phase.

There will be a general type of LED that will be used on the lighting boards to be used within the lighting circuit. Based on the general LED types, the controller software is set to the expected color point per channel, and to the light flux corresponding to a default drive current for LEDs in the lowest expected flux bin. Thus, LEDs are assumed to have a certain range of possible characteristics, defined by their flux bin and a lowest flux bin is used as a default.

For the lowest flux bin it may be that all current needs to pass through the LED arrangement to reach the default light flux (since the lowest flux bin corresponds to a lowest flux for a given current), corresponding to an infinite parallel resistance (an open circuit).

It can be assumed that the light output from a LED arrangement from the lowest flux bin is defined as $\phi_{min}$ at drive current I. More generally, this is a default drive current, and $\phi_{min}$ is a default light output flux to which the other flux bins are calibrated.

The parallel resistance can be determined that is needed to tune a LED string with a bin value resulting in a flux $\phi_{bin}(I)$ at the same current I, and a forward voltage (for the whole string for that channel) under operating conditions of $V_{f,bin}(I)$.

Using a characteristic relation between the flux and current of a LED the required current is such that:

$$\phi_{min}(I) = \phi_{bin}(I_{bin})$$

Thus, the current $I_{bin}$ flowing through the LED arrangement from this particular bin generates an output flux corresponding to the flux that would be generated by a LED from the minimum flux bin.

This gives the required bin current $I_{bin}$. By definition, $I_{bin}$ is lower than or equal to I (for the lowest bin $I = I_{bin}$). The simplest relation is a linear relation for $I_{bin}$, however more accurate estimations may be used. Using a linear approximation, $I_{bin}$ is defined as:

$$I_{bin} = I * \frac{\phi_{min}}{\phi_{bin}}$$

The required resistance can be calculated as:

$$R_{add} = \frac{V_{f,bin}(I_{bin})}{I - I_{bin}}$$

The default current I, corresponding in this case to the lowest light flux setting, will be set by PWM control and/or amplitude modulation of the preset drive current. The required resistor values are determined as part of the manufacture of the lighting circuit, and they are independent of the controller.

Figure 4:
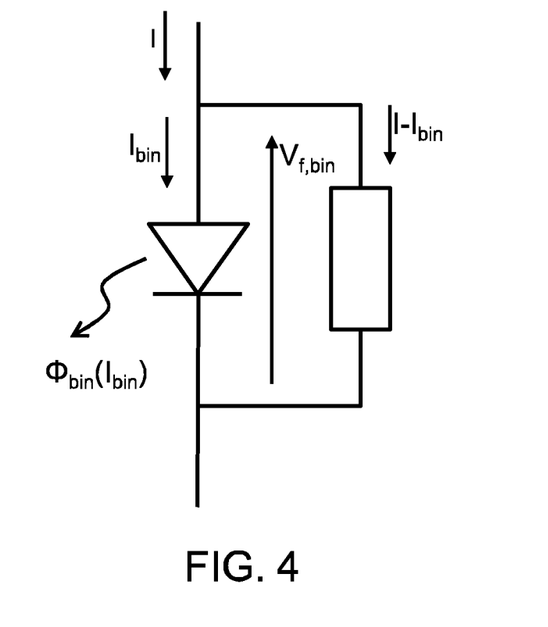
FIG. 4 shows currents and voltages to explain the operation of the current leakage path.

The currents and voltages are shown in FIG. 4.

The efficiency of the system is defined by the lowest flux bin efficiency. The total system efficiency loss caused by the bypass paths depends on the PWM ratio of the channels and the total bin width.

The flux bin range for example depends on the LED arrangement with the supplier. For example, for a typical bin value, the LED arrangement may fall between a lowest flux bin 10% below the typical flux value and a highest flux bin 10% above the typical flux value.

This range of 20% means roughly 20% of the current should be bypassed for the maximum flux bin. The resistor will then be rated for 20% of the consumed power of that color.

The invention involves leaking current from the main path. Using a resistor circuit (e.g. just a resistor) is the easiest and cheapest way to generate a leakage current. However, other ways are possible to realize the leakage current, e.g. by adding a linear current regulator in the leakage path.

FIG. 3 shows a single L2 lighting board. However, the light source arrangement may comprise a plurality of lighting boards, each having a respective series connection of a plurality of lighting channels of different output colors. The shunt switches may however be shared between the LED arrangements of corresponding channels of the plurality of lighting boards. Thus, multiple lighting boards may be controlled by the same controlled and with a shared set of shunt switches. The current leakage paths are implemented at the level of the individual lighting boards.

The number of connected LED boards will determine the preset current. This preset current setting is typically not changed dynamically. The current level is thus configured as part of an installation procedure, and may be set either by changing set values in the software or in hardware for example by setting the drive current with set resistors.

In the examples above, the PWM settings are used to change the brightness, with an unchanged color point. In a more advanced control approach, the PWM settings may also be used to set different color points, or for setting different color points at different light output flux levels such that the color point is dynamically controlled as a function of the dimming level.

In the examples provided, the LED arrangements are provided in a series configuration. Alternatively to the series configuration, the LED arrangements 12,14,16 can be placed in a parallel configuration.

In the examples provided, in each lighting channel a shunt switch is provided in parallel with the LED arrangement 12,14,16. It is however to be understood that the shunt switches are not essential for the invention to provide the desired effect of matching the light outputs of each LED arrangement when they are each driven with a substantially similar current.

The current leakage path provided in the examples can also be beneficial when multiple lighting circuits are desired to provide a similar light output when provided with a single setpoint. The current leakage path may provide a matching of the light outputs generated by each lighting circuit by ensuring that the light output of the first lighting circuit and the light output of the second lighting circuit is approximately equal when each lighting circuit is driven by a substantially similar current e.g. when provided with a single setpoint.

The lighting circuit is for example part of a luminaire such as a spot light.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

A single processor or other unit may fulfill the functions of several items recited in the claims.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to".

Any reference signs in the claims should not be construed as limiting the scope.

The invention claimed is:

1. A lighting circuit, comprising:
   a light source arrangement comprising a series connection or a parallel connection of a plurality of lighting channels;
   a current source for delivering a drive current to the light source arrangement,
   wherein each lighting channel comprises an LED arrangement and a current leakage path in parallel with the LED arrangement,
   wherein each current leakage path is arranged to bypass a current from the corresponding LED arrangement such that the light output of each LED arrangement is approximately equal when each LED arrangement is driven by a substantially similar current, and wherein, for each LED arrangement, the current leakage path arranged in parallel to the LED arrangement is adapted such that, for a default drive current, a light output flux generated by the LED arrangement is calibrated to a desired value.

2. The lighting circuit of claim 1, comprising a controller, wherein the light source arrangement comprises the series connection and wherein each lighting channel comprises a shunt switch in parallel with the LED arrangement, wherein the controller is configured to control the shunt switches.

3. The lighting circuit of claim 1, wherein each current leakage path comprises a resistor circuit.

4. The lighting circuit of claim 1, wherein each current leakage path comprises a linear current regulation circuit.

5. The lighting circuit of claim 2, wherein the controller is adapted to apply different shunt switch PWM duty cycles for different light flux settings of the light source arrangement.

6. The lighting circuit of claim 5, wherein the controller is adapted to apply different current source drive currents for different light flux settings of the light source arrangement.

7. The lighting circuit of claim 1, wherein the default drive current is the drive current for a minimum required flux for each of the channels for a lowest light flux bin of the light source arrangement.

8. The lighting circuit of claim 1, wherein the light source arrangement comprises a plurality of lighting boards, each having a respective series connection of a plurality of lighting channels of different output colors, wherein each shunt switch is shared between the LED arrangements of corresponding channels of the plurality of lighting boards.

9. The lighting circuit of claim 8, wherein each lighting board has a respective current leakage path in parallel with each LED arrangement.

10. A luminaire comprising the lighting circuit of claim 1.

11. The luminaire of claim 10, comprising a spot light.

12. A lighting system comprising:
    a first lighting circuit and a second lighting circuit, each lighting circuit comprising:
    a light source arrangement comprising a series connection of a plurality of lighting channels of different output colors;
    a current source for delivering a drive current to the light source arrangement; and
    a controller,
    wherein each lighting channel comprises:
        an LED arrangement; and
        a shunt switch in parallel with the LED arrangement,
    wherein each lighting channel further comprises a current leakage path (Radd FW, Radd Lime, Radd CW) in parallel with the LED arrangement, and
    wherein the controller is configured to control the shunt switches, wherein each current leakage path is arranged to bypass a current from the corresponding LED arrangement such that the light output of the first lighting circuit and the light output of the second lighting circuit is approximately equal when each lighting circuit is driven by a substantially similar current, and wherein, for each LED arrangement, the current leakage path arranged in parallel to the LED arrangement is adapted such that, for a default drive current, a light output flux generated by the LED arrangement is calibrated to a desired value.

* * * * *